United States Patent
Ito et al.

(10) Patent No.: US 8,262,746 B2
(45) Date of Patent: Sep. 11, 2012

(54) METHOD OF PRODUCING ELECTRODE PLATE FILLED WITH ACTIVE MATERIAL, METHOD OF PRODUCING BATTERY USING THEREOF

(75) Inventors: Katsuya Ito, Awaji (JP); Kazuhiro Yoshimura, Sumoto (JP); Masahiro Hosoda, Minamiawaji (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 776 days.

(21) Appl. No.: 11/509,027

(22) Filed: Aug. 24, 2006

(65) Prior Publication Data

US 2007/0062029 A1    Mar. 22, 2007

(30) Foreign Application Priority Data

Aug. 26, 2005  (JP) ................. 2005-245162
Jan. 12, 2006  (JP) ................. 2006-004701

(51) Int. Cl.
*H01M 4/62*  (2006.01)
*H01M 4/02*  (2006.01)
*H01M 4/04*  (2006.01)
*H01M 6/02*  (2006.01)
*H01M 2/08*  (2006.01)
*B05D 5/12*  (2006.01)

(52) U.S. Cl. ....... 29/623.5; 429/185; 429/217; 429/232; 429/163; 427/58

(58) Field of Classification Search .................. 429/175, 429/184, 186, 178, 181, 176, 245, 209, 417; 29/623.5, 623.3; 205/177; 427/58
See application file for complete search history.

(56) References Cited

U.S. PATENT DOCUMENTS 3,701,690 A * 10/1972 Dermody et al. ............ 29/623.3
(Continued)

FOREIGN PATENT DOCUMENTS

EP    0 798 795 A2    10/1997
(Continued)

OTHER PUBLICATIONS

"Adhesives and Consolidants", Hamilton, Donny L., Conservation Research Laboratory, Adhesives and Consolidants—Conservation manual. Retrieved from http://nautarch.tamu.edu/crl/conservationmanual/File2.htm on Apr. 14, 2010.*

(Continued)

*Primary Examiner* — Jonathan Crepeau
*Assistant Examiner* — Kenneth Douyett
(74) *Attorney, Agent, or Firm* — Westerman, Hattori, Daniels & Adrian, LLP (57) ABSTRACT

A production method for producing an electrode plate that can hold well the active material and producing a battery using the electrode plate. A production method for an electrode plate of a battery includes the steps of: forming at least one electrode plate prototype by forming a layer filled with an active material on a main surface of a plate-shaped core body; and infiltrating a liquid containing a resin and an organic solvent into at least part of a circumference of the layer filled with the active material. The applied liquid infiltrates into the circumferential region of the active material filling area, namely an outer edge of the layer and an area in its vicinity including the outer edge. The resin contained in the liquid enhances the bonding force between the conductive core body and the active material particles and between the active material particles.

11 Claims, 6 Drawing Sheets

U.S. PATENT DOCUMENTS

| | | | |
|---|---|---|---|
| 5,709,918 A * | 1/1998 | Kimijima et al. | 428/40.1 |
| 5,709,967 A * | 1/1998 | Larsen | 429/175 |
| 6,316,142 B1 * | 11/2001 | Delnick et al. | 429/217 |
| 6,423,446 B1 * | 7/2002 | Miyazaki et al. | 429/209 |
| 2001/0036576 A1 * | 11/2001 | Murata et al. | 429/217 |
| 2003/0096153 A1 * | 5/2003 | Osenar et al. | 429/35 |
| 2003/0148187 A1 * | 8/2003 | Yamaguchi et al. | 429/245 |
| 2004/0248003 A1 * | 12/2004 | Tsutsumi et al. | 429/209 |
| 2005/0132562 A1 * | 6/2005 | Saito et al. | 29/623.5 |
| 2005/0164081 A1 * | 7/2005 | Ogura et al. | 429/185 |

FOREIGN PATENT DOCUMENTS

| | | |
|---|---|---|
| JP | 49-037132 A | 6/1974 |
| JP | 61-002265 A | 1/1986 |
| JP | 63-85869 U | 11/1986 |
| JP | 62-039677 A | 2/1987 |
| JP | 63-85869 U | 6/1988 |
| JP | 3-159074 A | 7/1991 |
| JP | 05-190200 * | 7/1993 |
| JP | 5-190200 A | 7/1993 |
| JP | 7-220759 A | 8/1995 |
| JP | 10-064533 A | 6/1998 |

OTHER PUBLICATIONS

Japanese Office Action dated Jun. 7, 2011, issued in corresponding Japanese Patent Application No. 2006-004701.

Japanese Office Action dated May 8, 2012 (mailing date), issued in corresponding Japanese Patent Application No. 2006-004701.

* cited by examiner

METHOD OF PRODUCING ELECTRODE PLATE FILLED WITH ACTIVE MATERIAL, METHOD OF PRODUCING BATTERY USING THEREOF

BACKGROUND OF THE INVENTION (1) Field of the Invention

The present invention relates to an electrode plate production method and a battery production method.

(2) Description of the Related Art

The process of producing an electrode plate used in a battery represented by an alkaline secondary battery includes a process in which a plate-shaped core body of an electrode plate is filled with an active material densely and broadly. However, the filled active material may remove from the core body while the battery is kept to be used. The active material is difficult to remove from the central part of the core body (active material filling area) since the central part is covered with a separator or the like, but is easy to remove from the circumferential part of the active material filling area since the end surfaces of the circumferential part are exposed to outside. Also, the electrode plate production process may include a step in which the active material is filled into a prototype of the core body and then the prototype is cut into pieces of a predetermined size. In the active material filling area after the cutting step, the bonding force between the conductive core body and the active material particles and between the active material particles is weaker at the cutting surfaces and their vicinities than at the central part of the active material filling area. This makes the active material easy to remove from the vicinities of the cutting surfaces even if a large external force is not given. When this happens, the content amount of the active material decreases, and the battery capacity decreases. At the same time, the removed active material may bridge between the positive and negative electrode plates to cause an electrical short circuit to occur.

To cope with this problem, the following methods, for example, have been proposed to restrict the removal of the active material from the active material filling area: a method of covering the circumferential part, where the removal is easy to occur, of each electrode plate with tape (Japanese Patent Application Publication No. 3-159074); a method of covering the circumferential part with a thermal-adhesive resin (Japanese Patent Application Publication No. 5-190200); and a method of applying a resin solution to the circumferential part of the electrode plate (Japanese Utility Model Application Publication No. 63-85869).

In the case of the method of covering the circumferential part with tape, first the prototype of the electrode plate is cut and then the circumferential part is covered with tape. Also, in the case of the method of covering the circumferential part with a thermal-adhesive resin, it is necessary to attach a thermal-adhesive resin film to the circumferential part. However, such methods have some problems. For example, if the tape is unsteady and at least one surface thereof is adhesive, the tape may be distorted during the step of attaching the tape and adhesive portions may be bonded together. Also, in the case of the method of applying the resin solution, there is a problem that it takes time before the applied solution is dried. Accordingly, there is room for improving the production process in these methods.

SUMMARY OF THE INVENTION

The object of the present invention is therefore to provide a method for producing an electrode plate that can hold well the active material and producing a battery that uses the electrode plate.

The above object is fulfilled by the following production methods of the present invention.

A production method for an electrode plate of a battery, comprising the steps of: forming at least one electrode plate prototype by forming a layer filled with an active material on a main surface of a plate-shaped core body; and infiltrating a liquid containing a resin and an organic solvent into at least part of a circumference of the layer filled with the active material. Here, "forming a layer filled with an active material on a main surface of a plate-shaped core body" means to form a layer filled with an active material on a main surface of a plate-shaped core body, covering the main surface up to an edge thereof or covering the main surface except for the edge and an area in its vicinity including the edge. Also, "a circumference of the layer" means the circumferential region of the layer that is filled with the active material. That is to say, "a circumference of the layer" means an outer edge of the layer and an area in its vicinity including the outer edge.

After the electrode prototype, which is filled with the active material, is formed, the liquid is made to infiltrate into the area (the circumferential region of the active material filling area) from which the active material is apt to remove. After the infiltration of the liquid, the organic solvent vaporizes, but the resin remains in the circumferential region of the active material filling area. The remained resin enhances the bonding force between the active material particles and the bonding force between the conductive core body and the active material particles. This restricts the removal of the active material. Especially, since the liquid is made to infiltrate into the active material filling area, the present construction enhances the bonding force between the active material particles and the bonding force between the conductive core body and the active material particles in the thickness direction, as well as in the surface region of the active material filling area. That is to say, the present construction, which causes the liquid to infiltrate into the active material filling area, produces the advantageous effect of restricting the active material from removing both in the surface region of the active material filling area and in the inward thickness direction of the active material filling area.

In the case where tape or the like is adhered, it is required to adjust the position of the tape or the like with reference to the edge of the electrode plate prototype. Adhering the tape or the like therefore takes time and is cumbersome. Compared to this, for example, applying, spraying, or dipping can easily infiltrate the liquid into a certain region (circumferential region). Especially, adhering tape or the like should be performed onto each electrode plate. In contrast, according to the means of the present invention of infiltrating the liquid, it is possible to perform the process onto a plurality of electrode plates at a time. Generally, an organic solvent evaporates more easily than water. Accordingly, use of an organic solvent in a liquid to be applied accelerates the drying process, compared with applying a water solution. Use of such an organic solvent that dries immediately at normal temperature would thus improve the productivity. It would be understood from the above discussion that the production method of the present invention facilitates the production of the electrode plate and improves the production efficiency, compared with technologies that include the cumbersome process such as adhering tape or the like. Accordingly, use of the battery electrode plate produced by the production method of the present invention achieves a battery structured to restrict the deterioration in performance and to prevent occurrence of the electrical short circuit.

Although the liquid infiltrating step may be performed onto each electrode plate, it is preferable that the liquid infiltrating step is performed onto a plurality of electrode plates at a time. This is because it produces a larger advantageous effect in facilitating the production process than a method of adhering tape or the like. For example, first an electrode plate prototype forming step is performed to produce a plurality of electrode plate prototypes, then a layering step is performed to layer a plurality of electrode plate prototypes. And the layering step is followed by the aforementioned liquid infiltrating step. In this liquid infiltrating step, as a method of infiltrating resin into the active material filling area, the liquid is applied to end surfaces of the layered electrode plate prototypes. According to this method, with a mere application of the liquid onto the end surfaces of the electrode plate prototypes, the liquid infiltrates into the spaces between the active material particles filling the circumferential region. Accordingly, if a plurality of electrode plate prototypes are layered such that the active material in the end surfaces thereof is exposed to outside, the liquid is applied to the exposed active material. Also, even if a plurality of electrode plate prototypes are layered such that the active material in the end surfaces thereof is not exposed to outside, if the active material filling area is formed in the vicinity of the end surfaces, the liquid penetrates into the gaps between core bodies in the layered electrode plate prototypes by the capillary action or the like, and the liquid reaches the active material filling area, making the same state as when the liquid is applied to the exposed active material. Accordingly, regardless of whether the active material filling area is formed in the vicinity of the end surfaces of the electrode plate prototypes, or formed such that the active material in the end surfaces thereof is exposed to outside, the liquid reaches and infiltrates into the active material filling area. This results in the fulfillment of the object that the liquid containing a resin and an organic solvent infiltrates into at least part of a circumference of the active material filling area. As understood from this, according to the production method of the present invention in which a plurality of electrode plate prototypes are formed and layered beforehand, it is possible to perform only one liquid application step to infiltrate the liquid into the circumferential region of the active material filling area in each of the layered electrode plate prototypes. This further causes the resin to remain in the circumferential region to restrict the active material from removing from the electrode plate prototypes. The methods of the present invention described up to now therefore contribute to a further improvement of the productivity without necessity to introduce a complex production technology or equipment.

The liquid, as described above, contains a resin and an organic solvent. This prevents the electrode plates from bonding each other when they are dried up. For this reason, it is possible to dry up the liquid having infiltrated into the electrode plate prototypes while the electrode plate prototypes are layered. And it is possible to store the electrode plates as they are layered, and to stock them in a battery production apparatus as they are layered. That is to say, there is no need to separate the layered electrode plates one by one for drying them up, and layering them again for storing after they are dried. This improves the production efficiency.

It is preferable that the density of the resin in the liquid to be applied is 5 mass % to 45 mass %. This is because when the resin density is in the above-mentioned range, the electrode plate prototypes do not bond each other as they are layered, which makes it easier to extract the electrode plates from a stock in the battery production apparatus one by one during the battery production process. Also, a carbon black may be dispersed in the liquid to be applied. While the resin or the organic solvent infiltrates into the active material filling area, carbon black particles infiltrate only into a region closest to the edge and remain there to form a heap of carbon black particles. The heap further enhances the advantageous effect of restricting the active material from removing. This is because highly cohesive carbon black particles are heaped to fill the spaces between the active material particles, and the particles are adhered to each other while the heaped carbon black particles are covered with resin or while resin has infiltrated into the spaces between the heaped carbon black particles. Especially, when the active material contains cadmium, the above-described effect makes it possible to reduce the amount of removing cadmium. This reduces the cost for maintaining a clean environment. Also, since the carbon black particles are conductive, the presence of the particles further produces an advantageous effect of improving the conductivity between active material particles.

It is preferable that the liquid to be applied contains either a dye or a pigment. When such a dye or a pigment, especially an oil-based dye or pigment, is applied to color the objective components, the visibility of the objective components is improved.

A marking pen ink may be used instead of the liquid. The marking pen ink produces the same advantageous effect as the liquid. A battery using the electrode plate produced by the above-described method as at least one of the positive electrode plate and the negative electrode plate is produced. This provides such a high-quality battery that is constructed to restrict the reduction in the battery capacity.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1A is a perspective view showing electrode plates each of which includes a core body on which a layer filled with an active material has been formed, and showing separators each of which is sandwiched by the electrode plates;

FIG. 1B is a perspective view showing an electrode body that is formed into a roll by winding electrode plates and a separator;

FIG. 1C is an exploded perspective view of a battery that is formed by housing an electrode body in the shape of a roll into an outer container;

FIG. 2A is a perspective view of an electrode plate prototype whose core body is sandwiched by the active material filling layers;

FIG. 2B is a perspective view of an electrode plate prototype that is being cut;

FIG. 2C is a perspective view showing the state in which the cut electrode plate prototypes are layered;

FIG. 2D is a perspective view showing the step in which the solution is applied onto the end surfaces of the layered electrode plate prototypes;

FIG. 4A shows the layered electrode plate prototypes and the filled active material particles;

FIG. 4B shows how the applied solution infiltrates into spaces between active material particles;

FIG. 4C shows how the applied solution in which carbon black particles are dispersed infiltrates into spaces between active material particles;

FIGS. 6A and 6B are outline perspective views how electrode plate prototypes are produced;

DESCRIPTION OF THE PREFERRED EMBODIMENT

The following describes a battery production method in an embodiment of the present invention with reference to the attached drawings.

1. Battery Production Method

Figure 1A:
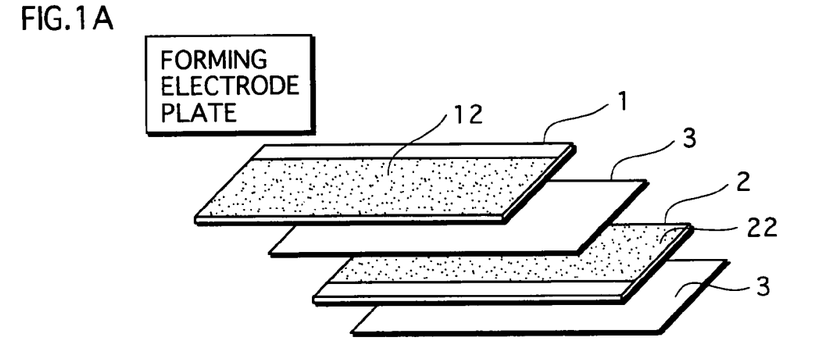
FIGS. 1A to 1C are perspective views showing an outline of the process of producing a battery of the invention embodiment.
Figure 1B:
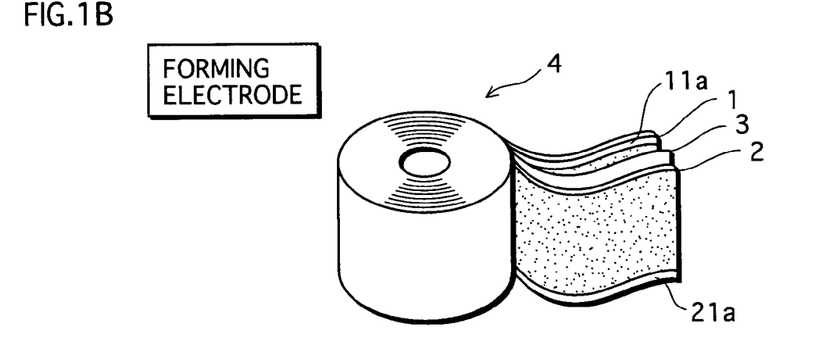
Figure 1C:
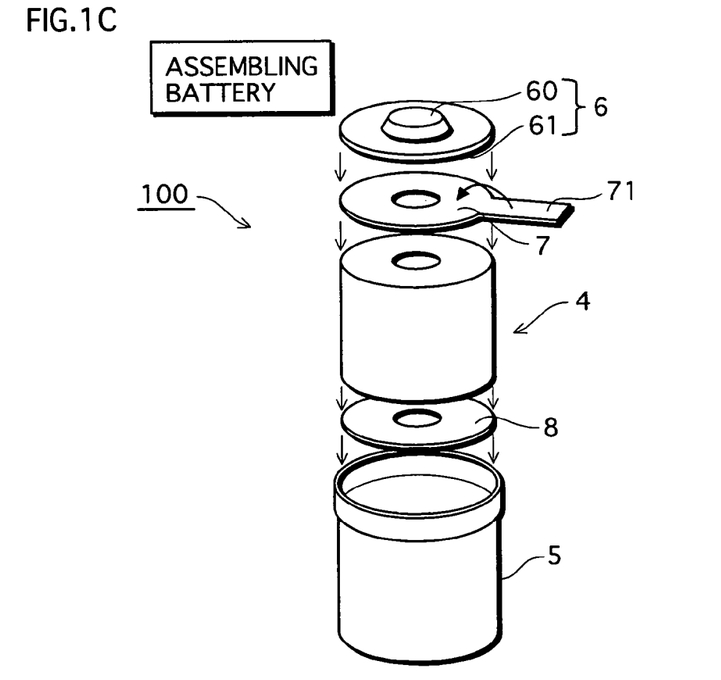

FIGS. 1A to 1C are perspective views showing an outline of the process of producing a cylindrical nickel cadmium battery (hereinafter merely referred to as "battery") 100, by the production method of the present embodiment.

As shown in FIG. 1A, a positive electrode plate 1 and a negative electrode plate 2 are arranged to face each other with a separator 3, which is made of polyamide or the like, in between. The negative electrode plate 2 will be described in detail later.

Then, as shown in FIG. 1B, an electrode body 4 is formed in a shape of a roll by winding the positive electrode plate 1, negative electrode plate 2, and separator 3 layered as described above. They are wound such that a lead connection part (positive collector) 11a of the positive electrode plate 1 extends out from one side of the separator 3 in the width direction to be exposed to outside, and that a lead connection part (negative collector) 21a of the negative electrode plate 2 extends out from the other side of the separator 3 in the width direction to be exposed to outside.

As shown in FIG. 1C, the negative collector 21a is fixed to an end surface of a negative collecting plate 8 by welding, and the positive collector 11a is fixed to an end surface of a positive collecting plate 7 by welding. The electrode body 4 is then housed in an outer can 5 which is cylindrical and has a bottom such that the negative collecting plate 8 is connected to the bottom of the outer can 5. The opening of the outer can 5 is sealed with a sealing unit 6 that includes a sealing lid 61 such that the positive collecting plate 7 is connected to the sealing lid 61 via a lead unit 71 (that is bent in the direction indicated by the arrow in FIG. 1C). In this process, the sealing unit 6 is caulked, while a gasket (not illustrated) made of an insulator is disposed there. With this, the negative electrode plate 2 and the outer can 5 are electrically connected, and the positive electrode plate 1 and a positive terminal 62 are electrically connected. After the electrode body 4 is housed in the outer can 5, alkaline electrolyte, such as potassium hydroxide solution, is infused into the electrode body 4.

2. Forming Electrode Plate

The following describes how the negative electrode plate 2 is formed, with reference to FIGS. 2A to 2D. In the present embodiment, the negative electrode plate 2 is presumed to be non-sintered. The negative electrode plate 2 is formed by performing the following steps in sequence in the stated order: an electrode plate prototype forming step in which electrode plate prototypes are formed; a layering step in which a plurality of electrode plate prototypes are layered to form a layered product; an application step in which a solution is applied to the layered product; and a drying step in which the layered product applied with the solution is dried. It is presumed that the positive electrode plate 1 is also non-sintered. It should be noted however that in the present embodiment, only the negative electrode plate 2 is subjected to a process dedicated to preventing the active material from removing. Since the positive electrode plate 1 is produced by a known production method, the production procedure of the positive electrode plate 1 is omitted.

Figure 2A:
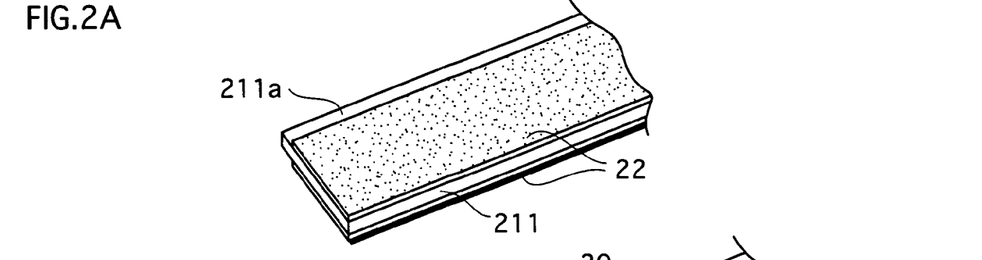
FIGS. 2A to 2D are perspective views showing the process of producing the negative electrode plate in the embodiment.
Figure 2B:
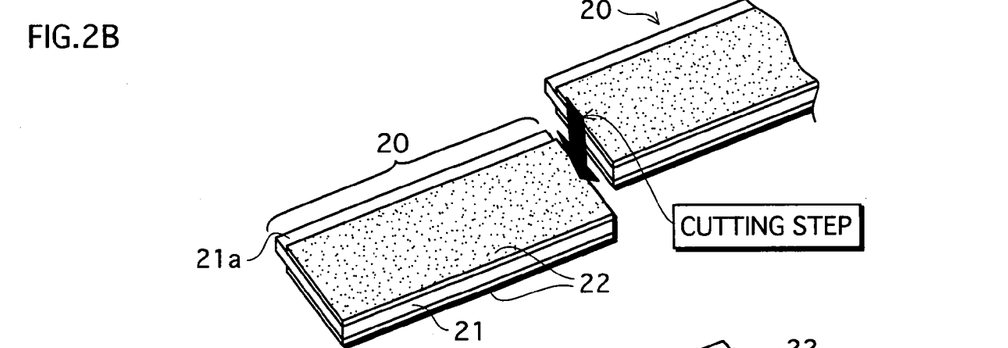

In the electrode plate prototype forming step, an active material paste is applied and filled to a conductive core body (punching metal) 211 being a nickel-plated steel plate in a shape of a belt with approximately 0.08 mm of thickness. The active material paste is made by mixing up a methyl cellulose solution, nylon fibers, and active material powder that contains 80 mass % of cadmium oxide powder and 20 mass % of metal cadmium powder. The applied active material paste is pressed and extended and dried to form a negative active material layer 22 on one main surface thereof. The negative active material layer 22 is 30 μm thick (FIG. 2A). The negative active material layer 22 is then formed such that the two short edges and one long edge thereof match those of the conductive core body 211, and such that the conductive core body 211 extends out from the other long edge of the negative active material layer 22 in the width direction to be exposed to outside. Then, as shown in FIG. 2B, the conductive core body 211 and the negative active material layer 22 are cut as one unit, so that the conductive core body 211 is divided into electrode plate prototypes 20 of a predetermined length.

Figure 2C:
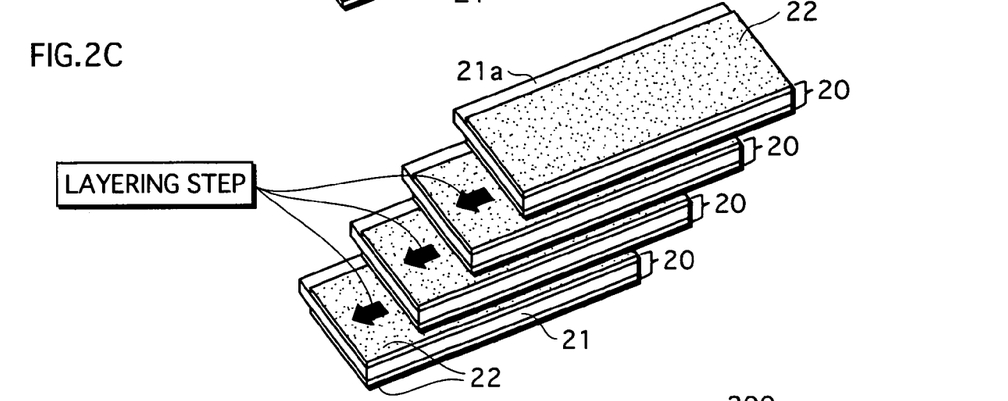

In the layering step, a plurality of electrode plate prototypes 20 formed in the electrode plate prototype forming step are layered as shown in FIG. 2C. This process is performed such that all of the negative collectors 21a are aligned at one side (end surface) of the electrode plate prototypes 20, and the other end surfaces 200a, 200b, and 200c are also aligned. This forms a layered product 200 composed of 80 layers of electrode plate prototypes 20 that are stacked all in the same manner (note that in the drawings, only four layers of electrode plate prototypes 20 are shown for the sake of convenience).

The layered product 200 formed in this way is subjected to the following solution application step.

Figure 2D:
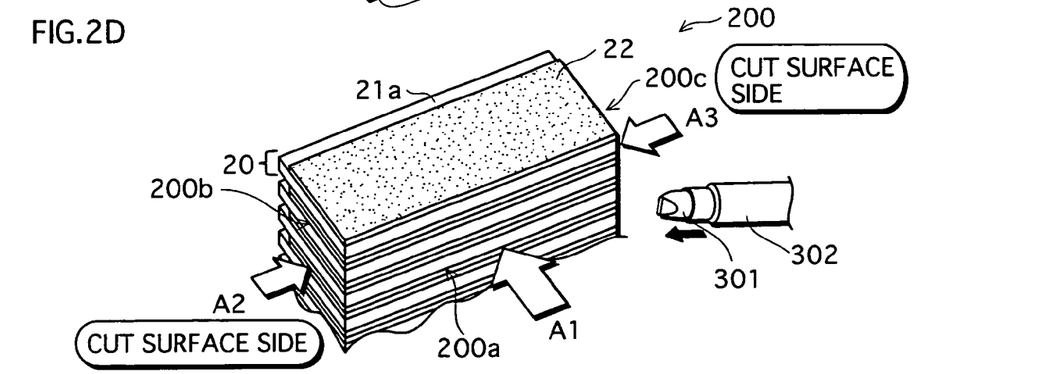

A solution made by mixing xylene resin (=Nikanol HP-100 which is a trademark of Mitsubishi Gas Chemical Company Inc.) with xylene is applied to three end surfaces 200a, 200b, and 200c of the layered product 200 (in the directions indicated by outline arrows A1, A2, and A3) except for an end surface along which the negative collectors 21a are aligned. To apply the above-described solution to the layered product 200, a container 302 provided with a felt 301 infiltrated with the solution is used. That is to say, the above-described solution is applied to the three sides (end surfaces) of the electrode plate prototypes 20, each side being: exposed end surfaces of two negative active material layers 22; and an exposed end surface of the conductive core body 211 sandwiched by the negative active material layers 22. It should be noted here that the density of the xylene resin in the above-described solution is 7.5 mass %.

Figure 3:
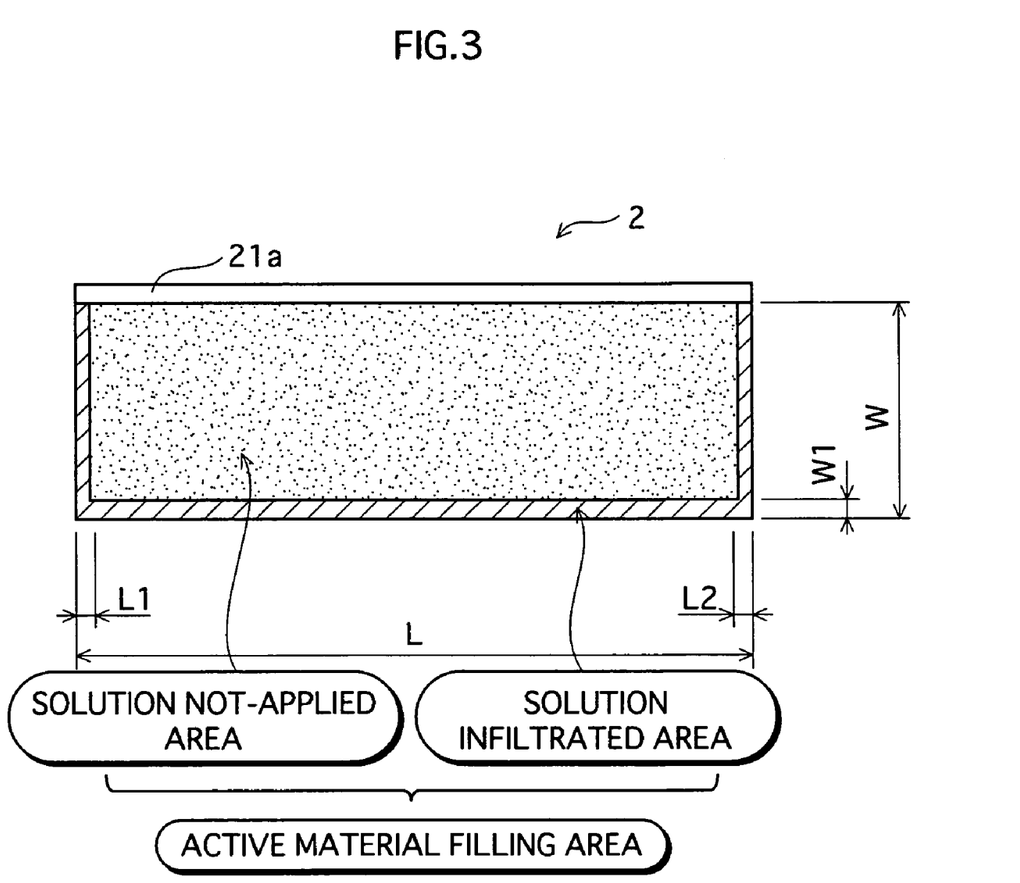
FIG. 3 is a top plan view of the negative electrode plate in the embodiment.

As shown in FIG. 3 which is a top plan view of the layered product 200, the applied solution infiltrates into the negative active material layer 22 of each electrode plate prototype 20 by thicknesses of L1, L2, and W1, respectively to divide the active material filling area into a solution infiltrated area and a solution not-infiltrated area (a solution not-applied area). In conventional batteries including active-material-filling electrode plates, the active material is easy to remove from an area, which corresponds to the solution infiltrated area and is exposed to outside, as the battery is used. To cope with this problem, in the present embodiment, a solution mixed with xylene resin is applied to an electrode plate prototype that has already been filled with the active material that uses resin (methyl cellulose), so that the solution infiltrated area impregnated with the xylene resin is formed.

Figure 4A:
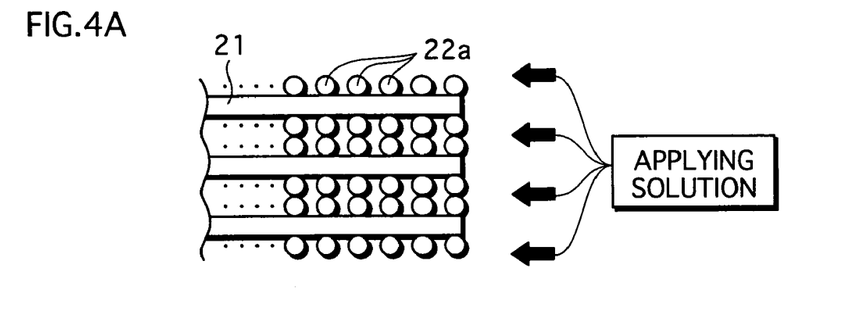
FIGS. 4A to 4C show how the application step in the embodiment proceeds.
Figure 4B:
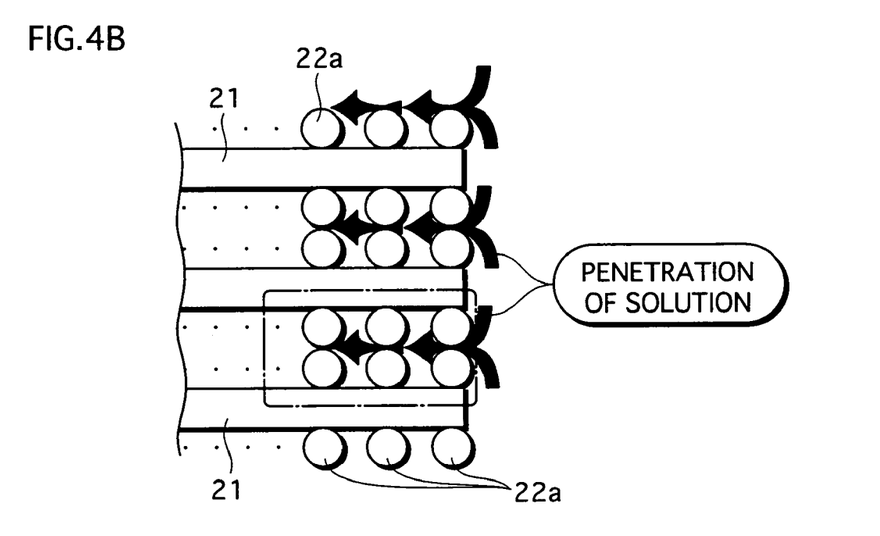
Figure 4C:
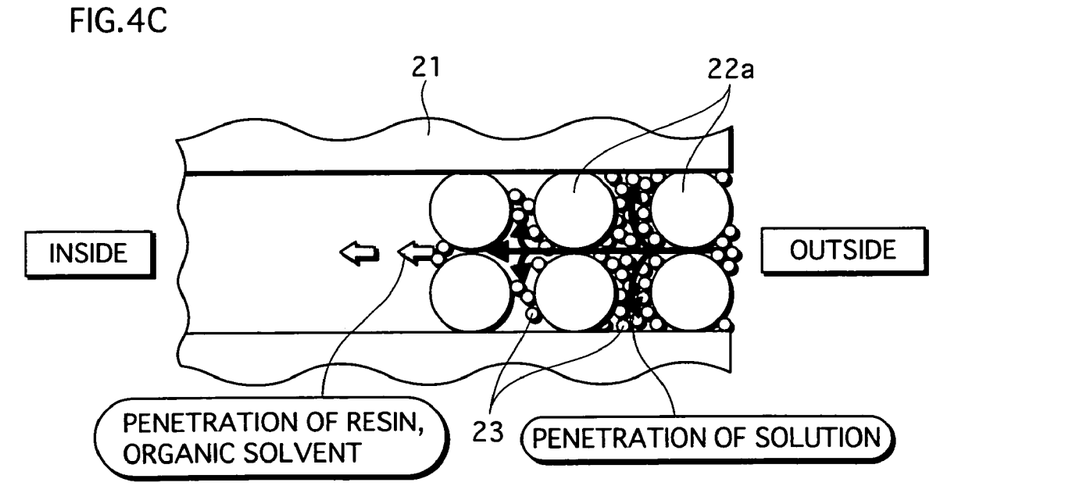

The solution containing xylene of the above-described density is easy to infiltrate. For this reason, as shown in FIGS. 4A to 4C, in the above-described application step, the solution penetrates into the spaces between negative active material particles 22a due to the capillary action, and forms the solution infiltrated area. That is to say, by applying the solution to only portions of the layered product 200 that are exposed to outside (end surfaces of the negative active material layer 22), it is possible to form the solution infiltrated area that extends inwardly from end surfaces of the active material filling area of the negative active material layer 22.

In the drying step that is performed after this, a plurality of electrode plate prototypes 20 are laid in a layered state (the layered product 200) at a normal temperature for a predetermined time period (120 minutes) This causes xylene in the solution to vaporize, leaving the xylene resin in the solution infiltrated area. Here, if a solution made by dissolving a water-soluble resin such as polyvinyl alcohol in water were applied, a lot of time would be required until the solution is dried up. However, an organic solvent such as xylene is used as in the above-described solution, the solution is dried in a short time period, and the xylene resin penetrates into the spaces between the negative active material particles 22a, without staying at gaps between the negative electrodes 2. This prevents the negative electrodes 2 from being adhered to each other by the xylene resin.

After this, a separating step is performed to separate the layers of electrode plate prototypes 20 from the layered product 200 one by one to obtain 80 pieces of negative electrodes 2.

As described above, after the solution is applied to the layered product 200 in the application step and the applied solution is dried in the drying step, the resin remains in the spaces between the negative active material particles 22a and remains on the surface of the negative active material layers 22. The remained resin enhances the bonding force between the negative active material particles 22a and the bonding force between the conductive core body 211 and the negative active material particles 22a. Accordingly, the solution infiltrated area, that extends inwardly from end surfaces of the active material filling area of the negative active material layer 22, is not inferior to the central portion of the negative active material layer 22 in the bonding force. The active material particles in the central portion of the negative active material layer 22 are fixed by the resin contained in the methyl cellulose solution used in the electrode plate prototype forming step in which the active material particles are filled. The active material particles at the edges of the negative active material layer 22 are also fixed by the resin contained in the methyl cellulose solution. However, the edge portion, namely, the solution infiltrated area is impregnated with xylene resin having been applied in the application step. This further enhances the bonding force between the negative active material particles in the edge portion. Especially, the xylene resin not only coats the surface of the negative active material layer 22, but enhances the bonding force between the negative active material particles in inward thickness direction of the solution infiltrated area. That is to say, compared with a construction in which resin is attached to the surface of the negative active material layer 22 by means of tape, for example, the present construction with the solution infiltrated area is higher in the effect of preventing the negative active material particles 22a from removing. It is accordingly possible to prevent the negative active material particles 22a from removing from the negative active material layer 22 even if the battery 100 provided with the negative electrode plate 2 receives an external force, or even if the negative active material layer 22 swells due to repetition of charging/discharging.

In the present embodiment, the solution is applied to the layered product 200 in the application step. However, the layering step may be omitted, and the solution may be applied to one layer of or a few layers of electrode plate prototypes 20. This also provides the same advantageous effect of preventing the active material particles from removing.

In the case where edges of the negative active material layer 22 are covered by tape or the like, the covered portion of the negative active material layer 22 is completely shut off from outside and cannot contribute to the charging/discharging reaction. However, in the case of the present embodiment in which resin is caused to penetrate into the spaces between the negative active material particles to use the bonding force of the resin, a more amount of area of the negative active material layer 22 is exposed to outside than the case where tape or the like is used. This restricts the deterioration of the charging/discharging reaction.

With respect to the resin to be mixed with the solution, not limited to xylene resin, but any resin, for example polyvinyl chloride, may be used in so far as it has ability to penetrate into the active material filling area and bond the reactive material particles. With respect to the organic solvent, not limited to xylene, but, for example, acetone or tetrahydrofuran may be used. As an alternative, an oil-based marking ink which is made by mixing a resin and a colorant with an organic solvent may be used.

Further, a solution in which carbon black particles having conductivity are dispersed may be used in the above-described application step. In this case, as shown in FIG. 4C that is an enlarged view of a part in FIG. 4B enclosed by a dashed-dotted line, carbon black particles 23 such as acetylene black particles, which are dispersed in the solution, are apt to penetrate by the capillary action and accumulate in vicinities of edges of the negative active material layer 22. The carbon black particles 23 are accumulated densely since they have high cohesion. The carbon black particles 23 are covered with a resin that remains after the application or a resin that is further applied, and such a resin penetrates into the spaces between the carbon black particles 23. This forms a strong layer of the accumulated carbon black particles 23. That is to say, the bonding force between the negative active material particles is stronger in the case where the resin fills the spaces between the accumulated negative active material particles that have high cohesion, than in the case where the not-accumulated negative active material particles are bonded with each other by a resin.

3. Confirmation Experiment

The following experiment was conducted to verify the advantageous effects of the negative electrode plate 2 of the present embodiment. The experiment was conducted on the following three types of electrode plates.

Invention Example 1a

Negative electrode plate 2 produced by the production method of the present embodiment.

Comparitive Example 1

Negative electrode plate 2a produced by applying only xylene to edges of the active material filling area of the negative active material layer 22 of the electrode plate prototype 20 produced by the production method of the present embodiment.

Comparitive Example 2

Electrode plate prototype 20 produced by the production method of the present embodiment.

Invention Example 1b

Negative electrode plate 2b produced in the same manner as Invention Example 1a above, except that the density of the xylene resin in the solution is 5.0 mass %.

Comparitive Example 3

Negative electrode plate 2c produced in the same manner as Invention Example 1a above, except that the density of the xylene resin in the solution is 2.5 mass %.

Of these, the negative electrode plates 2a, 2b, and 2c of the Comparative Example 1, Invention Example 1b, and Comparative Example 3 were produced through the layering step, drying step, and separating step in the same manner as Invention Example 1a, but by applying different solutions, respectively. Also, the solution was applied to the same area in the application step.

3-1 Experiment 1

For each of the three types of electrode plates, the negative electrode plate 2 was dropped 300 times from the height of 5 cm, and the amount of removed negative active material was measured. The results are shown in Table 1 below. The values in the table are represented as relative values that are relative to the amount of removed negative active material in Comparative Example 2 (the negative electrode plate prototype 20), which is "1".

TABLE 1

|  | Solution Type | Amount of Removal |
|---|---|---|
| Invention Example 1a | Nikanol (Density 7.5%) + Xylene | 0.42 |
| Comparative Example 1 | Only Xylene | 0.85 |
| Comparative Example 2 | None | 1.00 |
| Invention Example 1b | Nikanol (Density 5.0%) + Xylene | 0.51 |
| Comparative Example 3 | Nikanol (Density 2.5%) + Xylene | 0.73 |

It is found from Table 1 that the negative electrode plate 2 in Invention Example 1a greatly restricts the removal of the active material, compared with Comparative Examples 1 and 2. This indicates that the negative electrode plate 2 having the negative active material layer 22, which is impregnated with resin such as xylene resin, has been improved in the capability to hold the negative active material. This contributes to the restriction of the deterioration in the battery performance of the battery 100 that includes the negative electrode plate. This advantageous effect is produced by the simple construction in which the above-described solution is applied to the end surfaces of the negative electrode plate prototype 20. This eliminates such a cumbersome work in the production process as is required when tape or the like is used to prevent the active material from removing.

Further, in the above-described application step in the present embodiment, the solution is applied to the layered product 200 that is composed of a plurality of layered negative electrode plates 2. This means that only one application step is required to apply the solution to the plurality of layered negative electrode plates 2 to obtain the advantageous effect of restricting the removal of the active material. This production method accordingly enables a plurality of negative electrode plates 2, which contribute to the restriction of the deterioration in the battery performance, to be produced easily. This leads to an improvement in the production efficiency in the mass production of the battery.

It is also found from Table 1 that the negative electrode plate 2b in Invention Example 1b greatly restricts the removal of the active material. With respect to the negative electrode plate 2c in Comparative Example 3, it also restricts the removal of the active material, but the amount of the restriction is smaller than Invention Examples 1a and 1b. From this, it is considered to be preferable that the density of the xylene resin in the solution is at least approximately 5 mass %.

3-2 Experiment 2

Next, the density of the xylene resin in the solution to be applied in Invention Examples 1a and 1b, which had been confirmed to restrict the removal of the active material, was studied through another experiment. In this experiment, five types of solutions that are different in the xylene resin density from the solution used in Experiment 1 were used. The solutions were respectively applied to the layered products 200, and the layered products 200 were dried while the electrode plate prototypes were layered in each layered product 200. After this, it was confirmed whether or not electrode plate prototypes were adhered to each other.

The densities of the xylene resin in the solutions of the present experiment are 20 mass %, 30 mass %, 40 mass %, 45 mass %, 50 mass %, and 60 mass %, respectively. The results of the present experiment are shown in Table 2. In Table 2, "Present" indicates that an adhesion between negative electrode plate prototypes 20 constituting the layered product 200 was detected, and "None" indicates that such an adhesion was not detected. Also, the sign "○" indicates that the layers of negative electrode plate prototypes 20 could be easily separated from the layered product 200 one by one, and the sign "x" indicates that it was not easy to separate the layers of negative electrode plate prototypes 20. It should be noted here that the samples of the present experiment are different from the above-described embodiment only in the density of the xylene resin in the solution, and that a difference in the density did not cause a change in the amount of removed negative active material.

TABLE 2

| Resin Density (mass %) | Adhesion between Negative Electrode Plates | Workability |
|---|---|---|
| 20 | None | ○ |
| 30 | None | ○ |
| 40 | None | ○ |
| 45 | None | ○ |
| 50 | Present | X |
| 60 | Present | X |

As apparent from Table 2, no adhesion between negative electrode plates was detected in the samples whose xylene resin density is in the range from 20 mass % to 45 mass %, but the adhesion between negative electrode plates was observed in the samples whose xylene resin density is 50 mass % or more, which means the production efficiency would be deteriorated. One reason for this is considered to be that when the xylene resin density is higher than a predetermined value, the xylene resin remains on the surface the negative active material layer 22. When such a phenomenon occurs, it becomes difficult to separate the layers of electrode plate prototypes 20 from the layered product 200 one by one. This goes against the purpose of the step to produce many negative electrode plates 2 easily, and reduces the efficiency in producing the battery 100. Accordingly, from the viewpoint of improving the efficiency in producing many negative electrode plates 2 easily, it is preferable that the density of the resin in the solution is 45 mass % or less.

Further, when it is taken into consideration that a similar effect is obtained when the resin density is 5.0 mass %, and that the effect is also obtained when the resin density is increased to the range from 20 mass % to 45 mass %, it is understood that the above-described advantageous effect is obtained when the density of the xylene resin in the solution is in the range from 5.0 mass % to 45.0 mass %.

As described above, this advantageous effect is easily obtained by applying the solution to the side surfaces of the layered product 200 composed of layers of electrode plate prototypes 20. In relation to the obtainment of the above-described advantageous effect, it is preferable that a dye or a pigment such as carbon black is dissolved into the solution so that the solution is colored. This improves the visibility of the application step, enabling the application to be done with reliability, and prevents reduction of the production yield since it prevents a solution-unapplied area from being left.

3-3 Experiment 3

A negative electrode plate applied with a xylene resin solution in which conductive particles of carbon black are dispersed was prepared, and was subjected to the same experiment as Experiment 1 to see the effects. The results are shown in Table 3 below. Table 3 also shows the results of negative electrode plates in Invention Example 1a and Comparative Example 2 for the sake of comparison. The following negative electrode plate was used in the present experiment.

Invention Example 2

Negative electrode plate 202 produced in the same manner as Invention Example 1a above, except that it used a solution in which 7.5 mass % of xylene resin is dissolved in xylene, and further 5.0 mass % of acetylene black (product name: Denkablack-granular) manufactured by Denki Kagaku Kogyo Kabushiki Kaisha is dispersed.

TABLE 3

|  | Amount of Removed Active Material | Amount of Removed Acetylene Black |
|---|---|---|
| Comparative Example 2 | 1 | — |
| Invention Example 1a | 0.42 | — |
| Invention Example 2 | 0.03 | 0.25 |

As understood from Table 3, the negative electrode plate 202 in Invention Example 2 greatly restricts the removal of the active material compared with Comparative Example 2 and Invention Example 1a. This supports the fact that the removal of the negative active material is greatly restricted especially by using a xylene resin solution in which acetylene black is dispersed.

The results also show that not only the amount of removal from the negative electrode plate 202 is restricted, but the amount of removed negative active material is greatly restricted. Therefore, this makes it possible to reduce the amount of cadmium that removes from the negative active material layer 22 during the battery production process, reducing the cost for maintaining a clean environment.

Also, acetylene black particles 23 are conductive, as is already known. For this reason, compared with the case where the negative active material layer 22 is bonded only by resin, use of the solution containing acetylene black particles 23 is preferable. This is because it also improves the conductivity of the negative electrode plate 2.

The above-described effect is similarly produced in so far as a carbon black having conductivity and high cohesion is used. Accordingly, Ketjen Black, for example, may be used instead of acetylene black.

3-4 Experiment 4

Negative electrode plates applied with commercially available marking pen ink were prepared and subjected to the same experiment as Experiments 1 and 2 to see the effects. The results are shown in Table 4 below. The following negative electrode plates were used in the present experiment. The present experiment includes the same production steps as Experiment 1, except for the applied solution.

Invention Example 3

Negative electrode plate 203 produced by applying black ink (product name: Magic Ink) manufactured by Teranishi Chemical Industry Co., Ltd.

Invention Example 4

Negative electrode plate 204 produced by applying red ink (product name: Magic Ink) manufactured by Teranishi Chemical Industry Co., Ltd.

Invention Example 5

Negative electrode plate 205 produced by applying baby blue ink (product name: Magic Ink) manufactured by Teranishi Chemical Industry Co., Ltd.

Invention Example 6

Negative electrode plate 206 produced by applying red ink (product name: Sakura Marker) manufactured by Sakura Color Products Corporation.

Comparitive Example 2

Electrode plate prototype 20, the same one used in Comparative Example 2 in Experiment 1.

The following Table 4 shows the experiment results for these types of ink.

TABLE 4

|  | Ink Type | Amount of Removal | Adhesion between Negative Electrode Plates |
|---|---|---|---|
| Comparative Example 2 | None | 1.00 | None |
| Invention Example 3 | Black Ink | 0.47 | None |
| Invention | Red Ink | 0.35 | None |

TABLE 4-continued

| | Ink Type | Amount of Removal | Adhesion between Negative Electrode Plates |
|---|---|---|---|
| Example 4 Invention Example 5 | Baby Blue Ink | 0.33 | None |
| Invention Example 6 | Red Ink | 0.20 | None |

As understood from Table 4, the negative electrode plates 203, 204, 205, and 206 in Invention Examples 3-6 restrict the removal of negative active material from the electrode plate prototypes 20, and it can be determined that it ensures a good workability and in the separating step, the layers of negative electrode plate prototypes 20 are easily separated from the layered product one by one. Although the compositions of these ink are not clear, marking pen ink generally contains resin for fixing the color. It is accordingly considered that the resin contained in the ink restricts the negative active material from removing.

Figure 5:
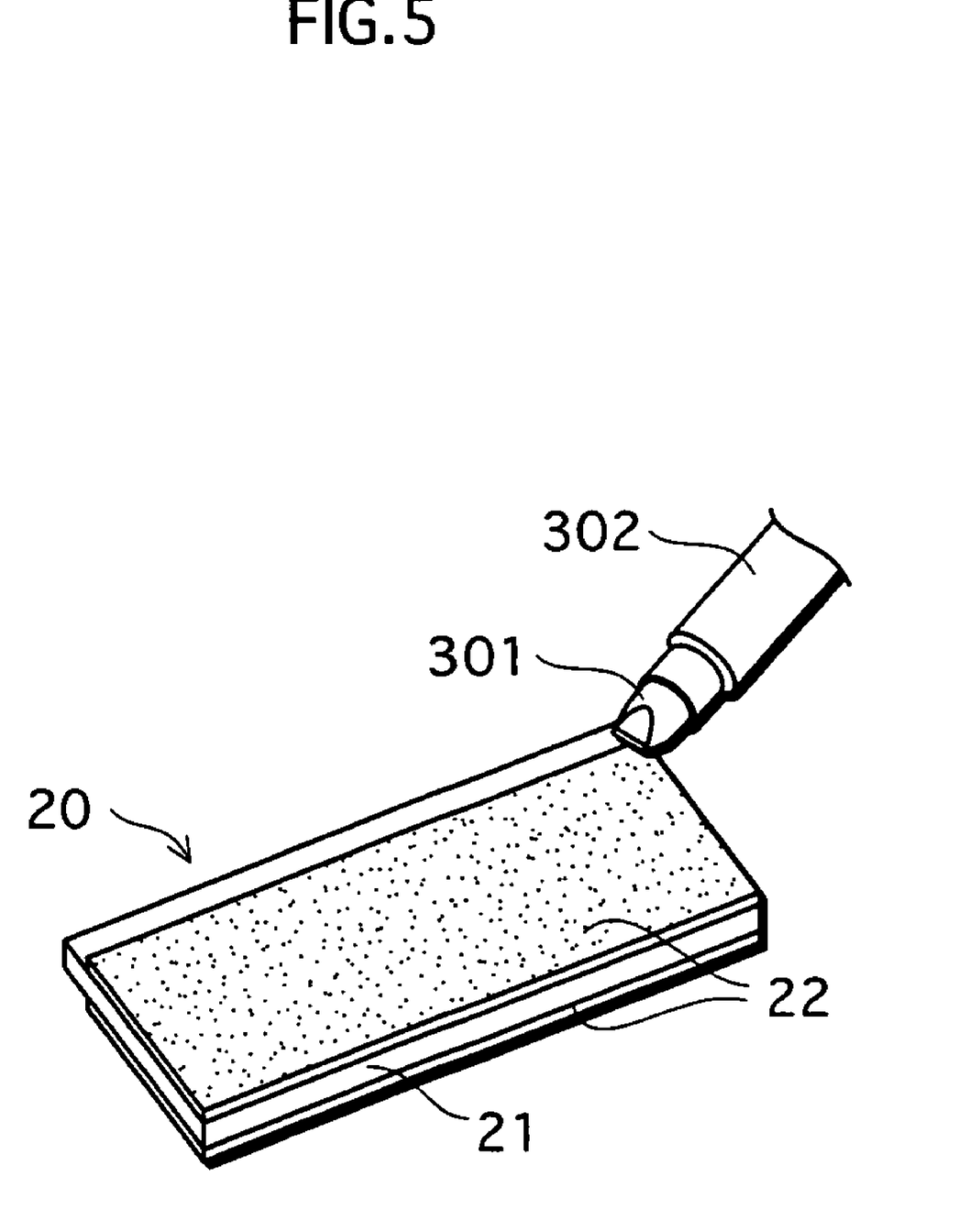
FIG. 5 is an outline perspective view showing the application step for one electrode plate prototype.

In the present embodiment, the application step is performed onto a layered product being layers of a plurality of electrode plate prototypes to obtain the advantageous effect of preventing the active material from removing. However, not limited to layers of a plurality of electrode plate prototypes, the application step may be performed onto, for example, one electrode plate prototype, as shown in the outline perspective view of FIG. 5. In this case, the application can be directly performed onto the circumferential part of the negative active material layer 22 of the electrode plate prototype 20. Also, the application can be performed onto the end surfaces of the electrode plate prototype 20, as in the case where the application is performed onto the end surfaces of layers of a plurality of electrode plate prototypes. If a solution is applied to a given portion of the surface, the solution infiltrates into the active material filling area in the thickness direction or a direction along the main surface thereof. It is therefore possible to easily infiltrate the resin into the circumferential part of the negative active material layer 22. That is to say, even a single negative electrode plate is produced at a time by the production method of the present embodiment, the produced negative electrode plate is provided with the advantageous effect of preventing the active material from removing.

4. Others

In the above-described embodiment, the solution is applied only to the negative electrode plate 2. However, the solution may be applied to the positive electrode plate 1, or may be applied to both the positive and negative electrode plates.

In the above-described embodiment, the solution is made to infiltrate into the circumferential part of the active material filling area to impregnate the resin into the circumferential part, by means of applying the solution to the surface. However, not limited to this, other means may be used. For example, the circumferential part of the active material filling area may be dipped into or attached to the solution of the present embodiment. Also, a solution is used for the application in the above-described embodiment. However, not limited to a solution in which a resin is dissolved, for example, a dispersion liquid in which a resin such as polytetrafluoroethylene is dispersed may be used. Also, in the above-described embodiment, the solution is made to penetrate into three among four sides of the active material filling area. However, the application step may be performed so that the solution penetrates into all four sides of the active material filling area. Further, the application step may be performed so that the solution penetrates into a portion where the active material is expected to remove most, in the three sides. This construction also provides the advantageous effect of preventing the active material from removing.

In the above-described embodiment, a plurality of negative electrode plate prototypes 20 are layered by aligning the ends thereof in the layering step. However, not limited to this, the ends of negative electrode plate prototypes may be shifted at one side to form a shape of a staircase. This enables the solution to be applied to a broader area of the active material filling area in the negative active material layer 22 than the present embodiment.

Resin solutions with different colors may be used to color the electrode plates or the like to differentiate between the positive electrode and the negative electrode, or between electrode plates of different specifications. This, for example, enables such electrode plates, which have the same outer shape but are different only in the thickness, to be differentiated easily. This therefore makes it possible to prevent mixing of different components in the succeeding steps.

In the above-described embodiment, punching metal is used as the core body of the negative electrode plate 2. However, punching metal may be replaced with nickel fiber or foaming nickel and the production process can be performed in the same manner as the present embodiment. Also, the positive electrode plate 1 and the negative electrode plate 2 are not limited to non-sintered electrode plates, but may be sintered electrode plates to comply with the present invention.

Figure 6A:
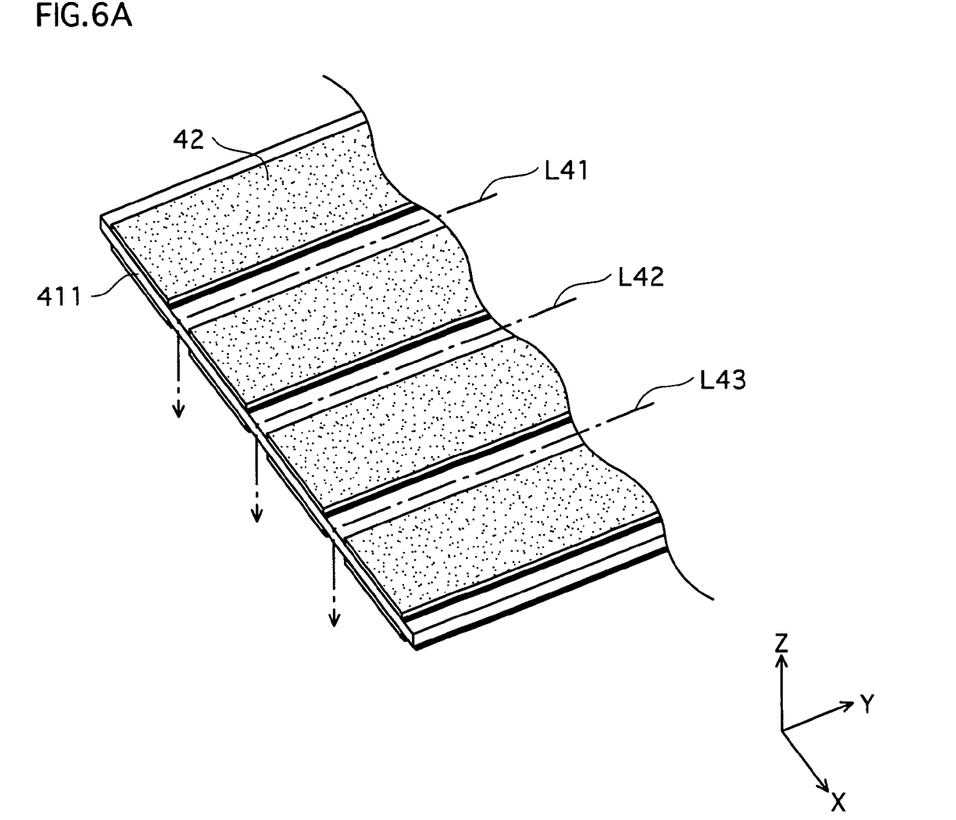
FIG. 6A is an outline perspective view showing a cutting step for cutting a conductive core body sheet on which active material layers are formed.
Figure 6B:
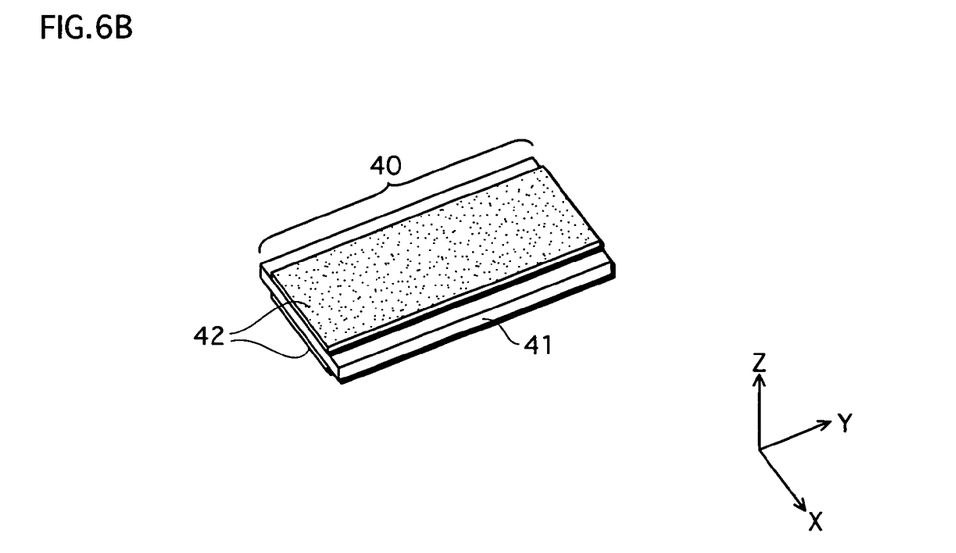
FIG. 6B is an outline perspective view showing an electrode plate prototype resulted from the cutting.

In the above-described embodiment, the conductive core body used in the electrode plate prototype forming step has a width corresponding to the width of the electrode plate to be produced, and has a length that corresponds to the length of a plurality of electrode plates. However, not limited to this, an electrode plate prototype of the present invention may be produced from, for example, a conductive core body sheet shown in the partial perspective view of FIG. 6A. FIG. 6A shows, as one example, a conductive core body sheet that has a width (in the X direction) that corresponds to a total width of four negative electrode plates to be produced. The conductive core body extends and has a length in the Y direction. As shown in FIG. 6A, negative active material layers 42 are formed in stripes on the conductive core body sheet. The conductive core body sheet is cut along the dashed-dotted lines L41, L42, and L43 between adjacent negative active material layers 42, in the longitudinal direction, into electrode plate prototypes 40 having a predetermined length. It should be noted that although in this case, the conductive core body sheet is cut in the longitudinal direction, it may be cut in the width direction (the Y direction) into a predetermined length. The cutting in the width direction may be performed before or after the cutting in the longitudinal direction. As shown in FIG. 6B, a produced electrode plate prototype 40 has a construction in which a conductive core body 41 extends out from both sides of layers, which sandwich the conductive core body 41, in the width direction to be exposed to outside. This construction results from the above-described cutting in which the conductive core body sheet is cut along lines between the negative active material layers 42 formed in stripes. As another cutting method, the active material may be filled into certain portions corresponding to, for example, the cutting lines L41 and L43 such that after the cutting, the conductive core body 411 extends out from only one side of the sandwiching layers in the width direction to be exposed to outside, where the conductive core body 411 does not extend out from the other side that corresponds to the cutting line L41 or L43.

In the above-described embodiment, the battery 100 is cylindrical. However, not limited to this, the battery 100 may be in other shapes. For example, the present invention is applicable to a battery provided with an electrode in which electrode plates 1 and 2 are layered.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A production method for an electrode plate of a battery, comprising the steps of:
    a) forming a plurality of electrode plates by forming a layer filled with an active material on a main surface of a plate-shaped core body;
    b) layering the plurality of electrode plates formed in the electrode plate forming step; and
    c) infiltrating a liquid, which contains a xylene resin and an organic solvent and in which a carbon black is dispersed, to end surfaces of the plurality of layered electrode plates, the organic solvent being selected from a group consisting of xylene, acetone and tetrahydrofuran.

2. The production method of claim 1, wherein the resin is either dissolved or dispersed in the organic solvent in the liquid.

3. The production method of claim 1, wherein the liquid used in the liquid infiltrating step contains either a dye or a pigment.

4. The production method of claim 1, wherein a marking ink is used as the liquid.

5. The production method of claim 1, wherein concentration of the resin in the liquid used in the liquid infiltrating step is 5 mass % to 45 mass %.

6. The production method of claim 1 further comprising the steps of drying the plurality of layered electrode plates having been applied with the liquid and removing the organic solvent from the liquid having infiltrated into the active material filling layer.

7. The production method of claim 6, wherein concentration of the resin in the liquid used in the liquid infiltrating step is 5 mass % to 45 mass %.

8. The production method of claim 6, wherein a marking ink is used as the liquid.

9. A production method for a battery, comprising the steps of:
    a) forming a plurality of electrode plates by forming a layer filled with an active material on a main surface of a plate-shaped core body;
    b) layering the plurality of electrode plates formed in the electrode plate forming step;
    c) infiltrating a liquid, which contains a xylene resin and an organic solvent and in which a carbon black is dispersed, to end surfaces of the plurality of layered electrode plates, the organic solvent being selected from a group consisting of xylene, acetone and tetrahydrofuran;
    d) forming an electrode body by arranging a positive electrode plate and a negative electrode plate to face each other with a separator in between, wherein at least one of the positive electrode plate and the negative electrode plate uses an electrode plate made from said at least one electrode plate having been subjected to the liquid infiltrating step and containing the active material; and
    e) assembling a battery by housing the electrode body formed in the electrode forming step into an outer container.

10. A production method for an electrode plate of a battery, comprising the steps of:
    a) forming a plurality of electrode plates by forming a layer filled with an active material on a main surface of a plate-shaped core body;
    b) layering the plurality of electrode plates formed in the electrode plate forming step; and
    c) infiltrating a liquid, which contains a xylene resin and an organic solvent, to end surfaces of the plurality of layered electrode plates, the organic solvent being selected from a group consisting of xylene, acetone and tetrahydrofuran.

11. A production method for a battery, comprising the steps of:
    a) forming a plurality of electrode plates by forming a layer filled with an active material on a main surface of a plate-shaped core body;
    b) layering the plurality of electrode plates formed in the electrode plate forming step;
    c) infiltrating a liquid, which contains a xylene resin and an organic solvent, to end surfaces of the plurality of layered electrode plates, the organic solvent being selected from a group consisting of xylene, acetone and tetrahydrofuran;
    d) forming an electrode body by arranging a positive electrode plate and a negative electrode plate to face each other with a separator in between, wherein at least one of the positive electrode plate and the negative electrode plate uses an electrode plate made from said at least one electrode plate having been subjected to the liquid infiltrating step and containing the active material; and
    e) assembling a battery by housing the electrode body formed in the electrode forming step into an outer container.

\* \* \* \* \*